United States Patent [19]
Heynemann et al.

[11] Patent Number: 4,743,219
[45] Date of Patent: May 10, 1988

[54] DEFORMABLE DRIVE SHAFT

[75] Inventors: Carl Heynemann, Taufkirchen; Otto Richter, Munich, both of Fed. Rep. of Germany

[73] Assignee: Metzeler Kautschuk GmbH, Munich, Fed. Rep. of Germany

[21] Appl. No.: 871,071

[22] Filed: Jun. 5, 1986

[30] Foreign Application Priority Data

Jun. 5, 1985 [DE] Fed. Rep. of Germany ....... 3520251

[51] Int. Cl.$^4$ ........................ F16C 1/02; B60K 17/22
[52] U.S. Cl. ....................................... 464/96; 464/181
[58] Field of Search ................. 464/92, 96, 179, 181, 464/183, 94, 95, 97

[56] References Cited

U.S. PATENT DOCUMENTS

| | | | |
|---|---|---|---|
| 2,207,496 | 7/1940 | Anderson, Jr. | 464/96 |
| 2,928,264 | 3/1960 | Goldsmith | 464/94 |
| 3,296,826 | 1/1967 | Van de Graaff | 464/181 |
| 3,606,392 | 9/1971 | Garrett | 464/96 X |
| 4,563,166 | 1/1986 | Walter et al. | 464/96 |

FOREIGN PATENT DOCUMENTS

| | | | |
|---|---|---|---|
| 256134 | 8/1926 | United Kingdom | 464/94 |
| 322154 | 11/1929 | United Kingdom | 464/94 |
| 1352231 | 5/1974 | United Kingdom | 464/94 |

Primary Examiner—Daniel P. Stodola
Attorney, Agent, or Firm—Herbert L. Lerner; Laurence A. Greenberg

[57] ABSTRACT

A deformable drive shaft includes drive side and driven side connections and a flexible intermediate section interconnecting the connections, the flexible intermediate section being formed of an alternating sequence of disc-shaped rigid segments and disc-shaped flexible segments, the formed rigid segments having surfaces with complementary funnel-shaped projections and funnel-shaped depressions formed thereon, the funnel-shaped projections of a given formed rigid segment extending through an adjacent flexible segment into adjacent respective funnel-shaped depressions of the next formed rigid segment.

5 Claims, 2 Drawing Sheets

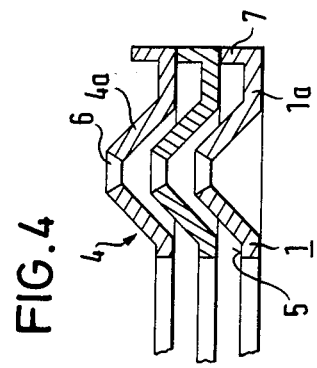
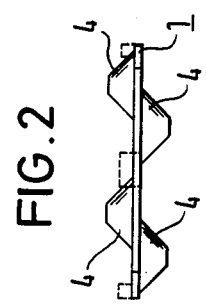
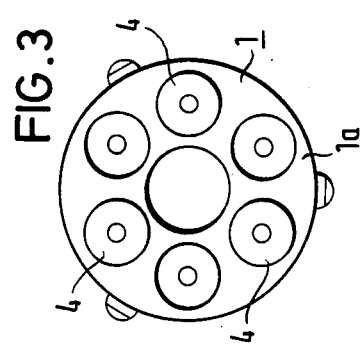
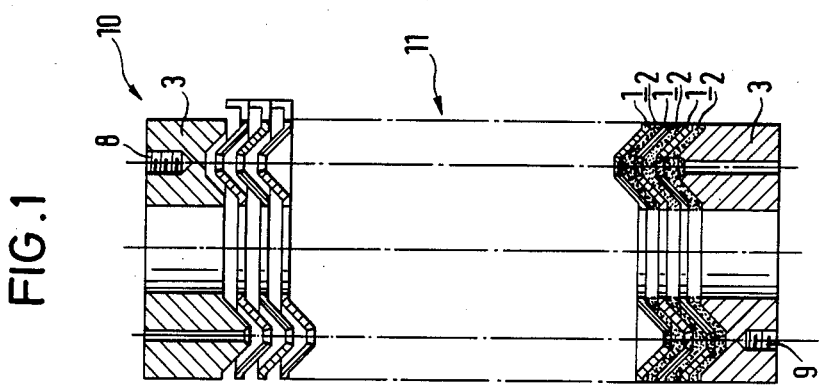

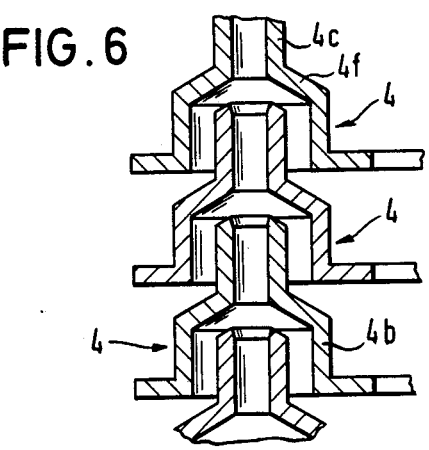
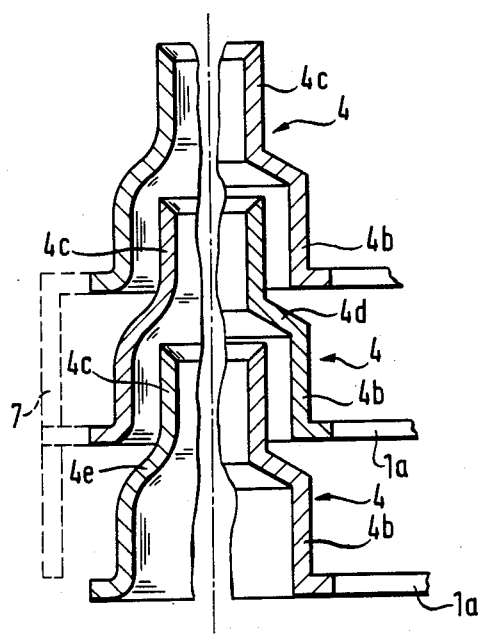
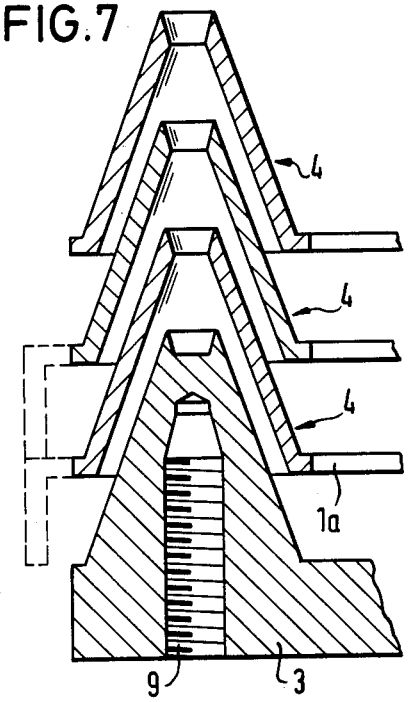

DEFORMABLE DRIVE SHAFT

The invention relates to a deformable drive shaft, especially for the wheels of a motor vehicle, including drive side and driven side connections and a flexible intermediate section.

On one hand, drive shafts of this type should be insulated against the transmission of sound through solids, and on the other hand they should be relatively light, yet capable of transferring relatively high torsional moments or torques.

For this purpose it is known to use hollow shafts formed of fiber-reinforced synthetics, such as are described in German Published, Non-Prosecuted Applications DE-OS No. 2 851 293 and DE-OS No. 3 045 141. However, these constructions are very costly to manufacture and do not fulfill the above-mentioned requirements, i.e. good insulation against the transmission of sound through solids with a small cross section, a long life span and a reliable transmission of relatively high torsional moments without a tendency to oscillate.

German Published, Non-Prosecuted Application DE-OS No. 3 139 247 discloses a universal shaft as a substitute for a cardan or universal joint, which is to be disposed in a rear wheel drive motor vehicle between the combustion engine in the front of the vehicle and the transmission which is disposed in the vicinity of the driven rear wheels, i.e. at a position where the relative movement of the components which are to be interconnected is relatively small. However, there are many applications in which relatively large movements of the various components have to be compensated.

It is accordingly an object of the invention to provide a deformable drive shaft, which overcomes the hereinaforementioned disadvantages of the heretofore-known devices of this general type, especially for the wheels of a motor vehicle.

In particular, a deformable drive shaft is proposed which is rigid with respect to torsion, i.e. which can transmit relatively high torsional moments and at the same time is soft with respect to bending so that it can also bridge large displacements between the components which are to be connected.

With the foregoing and other objects in view there is provided, in accordance with the invention, a deformable drive shaft, especially for the wheels of a motor vehicle, comprising drive side and driven side connections and a flexible intermediate section interconnecting the connections, the flexible intermediate section being formed of an alternating sequence of disc-shaped formed rigid segments and disc-shaped flexible segments, the formed rigid segments having surfaces with complementary funnel-shaped projections and funnel-shaped depressions formed thereon, the funnel-shaped projections of a given formed rigid segment extending and interlocking through an adjacent flexible segment into adjacent respective funnel-shaped depressions of the next formed rigid segment.

In accordance with an additional feature of the invention, the surfaces are on opposite sides of the disc-shaped formed rigid segments and the funnel-shaped projections and depressions are alternatingly formed on each of the surfaces.

In accordance with an added feature of the invention, at least three funnels-shaped projections and depressions are formed on each of the surfaces.

In accordance with a further feature of the invention, the funnel-shaped projections have ends with openings formed therein being filled with the elastomer material of the flexible segments.

In accordance with again another feature of the invention, the drive side connections include flanges having end surfaces with funnel-shaped depressions formed therein interlocking with the funnel-shaped projections formed on the outer end surfaces of the flexible intermediate section.

The advantages achieved with the invention are based on utilizing a principle found in a spinal column, i.e. the sequential arrangement of disc-shaped, formed rigid segments alternating with disc-shaped flexible segments, which are permanently connected to each other. The formed rigid segments have funnel-shaped projections on one side and corresponding funnel-shaped hollow spaces on the opposite side: the funnel-shaped projections extend through the adjacent flexible segments into the funnel-shaped depressions of the next formed rigid segment so that a positive rotational or torsional connection between two adjacent segments is achieved.

In accordance with again an additional feature of the invention, the formed rigid segments and the flexible segments have adjacent surfaces interconnected by an adhesive. This provides an additional connection with respect to torque and bending.

In accordance with another feature of the invention, the flexible segments are formed of an elastomer material, especially vulcanized rubber layers.

In accordance with a concomitant feature of the invention, there are provided spacers maintaining spacings between the formed rigid segments and being removable after the elastomer material has been filled into the spacings.

The unvulcanized rubber or caoutchouk material is filled into the interspace between the individual rigid segments and then vulcanized: subsequently, i.e. after the caoutchouc on vulcanized rubber has vulcanized to form rubber, the spacers are removed, so that there is no rigid connection between the adjacent rigid segments.

A form-locking axial connection can also be provided between the adjacent flexible and rigid segments: for this purpose, the flexible segments are provided with button-shaped projections which engage through openings in the funnel-shaped projections of the formed rigid segments, thereby producing an additional bending or flexing connection in the tension zone.

The transfer of torsion and bending moments which act on the drive shaft is partially effected by force-locking, partially by form-locking and partially by adhesion of the materials, so that on one hand a high torsion strength is obtained which is required for the transmission of high rotational moments and on the other hand a high deformability perpendicular to the longitudinal axis of the drive shaft is achieved, which is required for large relative movements of the components which are to be connected.

Other features which are considered as characteristic for the invention are set forth in the appended claims.

Although the invention is illustrated and described herein as embodied in a deformable drive shaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic, cross-sectional view of a drive shaft;

FIG. 2 is a side-elevational view of a formed rigid segment:

FIG. 3 is a top-plan view of a formed rigid segment;

FIG. 4 is a fragmentary, cross-sectional view showing the spatial arrangement of three formed rigid segments before embedding with unvulcanized rubber or caoutchouc;

FIG. 5 is a fragmentary, cross-sectional view of a modification of the funnel-shaped projections:

FIG. 6 is a view similar to FIG. 5 of another modification of the funnel-shaped projections; and FIG. 7 is a view similar to FIGS. 5 and 6 of an additional modification of the funnel-shaped projections.

Referring now to the figures of the drawings in detail and first, particularly to FIG. 1 thereof, there is seen a drive shaft indicated by the reference symbol 10, which is intended for the wheels of a motor vehicle. The drive shaft is provided with two flanges 3 of drive and driven side connections which are fastened by screws 8, 9 to non-illustrated units or assemblies which are to be connected with each other.

A flexible intermediate section 11 between the two rigid flanges 3, is formed by an alternating sequence of disc-shaped formed rigid segments 1 and disc-shaped flexible segments 2.

As shown in FIGS. 2 and 3, the disc-shaped rigid segments 1 are provided at both sides thereof with funnel-shaped projections 4, which in turn form funnel-shaped depressions on the other side. In the embodiment according to FIG. 3, for example, each side has three funnel-shaped projections and three correspondingly funnel-shaped depressions, in such a way that projections and depressions alternate on each side.

The number of funnel-shaped projections 4 can be varied, but should not be less than three, in order not to interrupt the form-locking torsional-connection between the adjacent formed rigid segments 1 under load. A form-locking connection is one which is formed due to the shape of the parts themselves, as opposed to a force-locking connection requiring external force.

FIGS. 4 to 7 show different embodiments of the funnel-shaped projections 4: all of the constructions start out from a disc-shaped basic body 1a of the formed rigid segments 1, on which the funnel-shaped projections 4 are provided.

In the construction according to FIG. 4, the funnel-shaped projections 4 have side walls 4a which extend at an angle of about 45° from the surface of the disc-shaped basic body 1a.

In the construction according to FIG. 5, the funnel-shaped projections 4 are formed of a cylindrical basic body 4b which is adjoined to another cylindrical body 4c with a reduced diameter. According to FIG. 5, the transition between the two cylindrical bodies 4b and 4c is accomplished on the right side by a flat surface 4d and on the left side by an arched surface 4e.

In the construction according to FIG. 6, the two cylindrical bodies 4b and 4c are connected with each other by a conical transition region 4f.

Finally, FIG. 7 shows a construction wherein the side walls or lateral surfaces of the funnel-shaped projections 4 extend from the surface of the basic body 1a at an angle of 70° to 75°, and are approximately twice as deep as the projections 4 in the embodiment according to FIG. 4.

The frontal or end surfaces of the flanges 3 which face toward the intermediate section 11 are provided with corresponding funnel-shaped projections and depressions as seen in FIG. 1, so that form-locking and force-locking torsional connections are created at these frontal or end surfaces as well.

The tips or points of the funnel-shaped projections 4 and of the complementary funnel-shaped depressions, are provided with passage openings 6, as shown in FIG. 4.

The flexible disc-shaped segments 2 between the disc-shaped formed rigid segments 1 with the funnel-shaped projections and depressions, are formed of an elastomer material, especially rubber.

The flexible, disc-shaped segments 2 can be produced by casting: for this purpose, the formed rigid segments 1 are kept at a predetermined distance from each other by spacers 7, as shown in FIG. 4, so that interspaces are created between the formed rigid segments 1. The unvulcanized rubber or caoutchouk mass is poured into these interspaces and vulcanized there. After the vulcanization process is finished, the spacers 7 are removed, so that there is no rigid and stiff connection between the formed rigid segments 1.

The unvulcanized viscous rubber or caoutchouk mass penetrates through the openings 6 in the funnel-shaped projections and depressions, so that a positive bending-connection is formed by the button-shaped configuration of the projections of the flexible segments which extend through the openings 6.

The funnel-shaped projections 4 of the formed rigid segments extend through the adjacent flexible segment 2 into the associated funnel-shaped depressions of the next formed rigid segment 1, so that a positive torsional connection is produced between the adjacent formed rigid segments 1.

However, a certain torsional motion between each two adjacent formed rigid segments is permitted by the rubber layer between the formed rigid segments; furthermore, this construction permits a certain deformation of the shaft 10 perpendicular to its longitudinal direction.

Furthermore, an additional force-locking torsion and bending-connection exists at connection surfaces indicated by reference numeral 5 in FIG. 4, between the formed, rigid, hard segments 1 and the flexible segments 2, namely at the transition between the surface of the basic body 1a and the funnel-shaped projections 4. This connection is still aided by the form-locking tension connection in the openings 6 of the funnel-shaped projections 4.

The transfer of the tension and bending moments which act on the drive shaft 10 is effected by a combination of the force-locking and form-locking connections between the parts and in some cases is further reinforced by the bond between the materials, if the surface of the flexible segments 2 are provided with an adhesive substance.

In a deformable drive shaft of this type, the incompressibility of the elastomer material is utilized, especially in the pressure zone of the bent shaft section, so that self-centering of the shaft and a reduction of the deflection in the bending direction are achieved. This reduction of the deflection in the bending direction leads to a desirable increase of the critical bending speed of the drive shaft.

We claim:

1. Deformable drive shaft, comprising drive side and driven side connections and a flexible intermediate section interconnecting said connections, said flexible intermediate section being formed of an alternating sequence of disc-shaped formed rigid segments and disc-shaped flexible segments, said formed rigid segments having surfaces on opposite sides thereof, each of said surfaces having alternatingly disposed funnel-shaped projections and funnel-shaped depressions formed thereon along an imaginary circle, said flexible segments being formed of elastomer material vulcanized between said formed rigid segments, said flexible segments having a thickness defining a distance between said formed rigid segments through which said funnel-shaped projections of a given formed rigid segment extend into and interlock with adjacent respective funnel-shaped depressions of the next formed rigid segment, and said funnel-shaped projections and depressions having ends with openings formed therein being filled with said elastomer material of said flexible segments interlocking said flexible segments.

2. Deformable drive shaft according to claim 1, wherein said flexible segments are formed of rubber.

3. Deformable drive shaft according to claim 1, wherein at least three funnel-shaped projections and depressions are formed on each of said surfaces.

4. Deformable drive shaft according to claim 1, wherein said drive side and driven side connections include flanges having end surfaces with funnel-shaped depressions formed therein interlocking with said funnel-shaped projections formed on said surfaces of said flexible intermediate section.

5. Deformable drive shaft according to claim 1, wherein said formed rigid segments and said flexible segments have adjacent surfaces interconnected by an adhesive.

* * * * *